United States Patent [19]

Kester

[11] Patent Number: 5,667,189
[45] Date of Patent: Sep. 16, 1997

[54] SELF-SUPPORTING FLOW HOOD

[76] Inventor: Michael H. Kester, 15909 Arbor Cir., Omaha, Nebr. 68130

[21] Appl. No.: 421,711

[22] Filed: Apr. 13, 1995

[51] Int. Cl.$^6$ ............................................. F16M 13/00
[52] U.S. Cl. .................. 248/601; 248/125.8; 248/200.1; 73/201; 73/273
[58] Field of Search ........................... 248/125.8, 200.1, 248/354.1, 354.3, 565, 600, 601; 362/410, 413, 431; 73/201, 273, 861, 861.62, 861.66

[56] References Cited

U.S. PATENT DOCUMENTS

| | | | |
|---|---|---|---|
| 785,455 | 3/1905 | Vigie | 248/200.1 X |
| 1,879,826 | 9/1932 | Shaffer | 248/354.1 X |
| 2,672,319 | 7/1954 | Nelson | 254/148 |
| 2,714,498 | 8/1955 | Wuthrich | 248/354.3 |
| 2,858,094 | 10/1958 | Olson | 248/355 |
| 4,101,036 | 7/1978 | Craig | 248/200.1 X |
| 4,111,408 | 9/1978 | Love | 248/200.1 X |
| 4,695,028 | 9/1987 | Hunter | 248/354.1 |
| 4,733,844 | 3/1988 | Molloy | 248/354.1 |
| 4,928,916 | 5/1990 | Molloy | 248/354.1 |
| 5,322,403 | 6/1994 | Herde | 248/354.1 X |

*Primary Examiner*—John A. Ricci
*Attorney, Agent, or Firm*—Henderson & Sturm

[57] ABSTRACT

An adjustable, spring-loaded support mast which is affixed to standard flow hoods in order to maintain the hoods in position over ventilation registers and diffusers while air flow measurements and adjustments are made. The mast is adjustable in length to accommodate different ceiling heights and is spring loaded to facilitate the positioning and removal of the flow hood over the diffuser as well as to hold it firmly in place. This allows air flow adjustments to be made much more quickly and efficiently, saving time, expense and manpower.

5 Claims, 5 Drawing Sheets

SELF-SUPPORTING FLOW HOOD

TECHNICAL FIELD

The present invention relates to flow hoods, and more particularly to an adjustable, spring-loaded support mast for holding flow hoods in position over heating, air conditioning, and ventilation registers and diffusers while flow measurements and adjustments are conducted.

BACKGROUND ART

Flow hoods are used in the heating, ventilation, and air conditioning industry to measure the amount of air flow through diffusers, registers and grilles so that proper air flow can be set by means of volume dampers within the ductwork. Typically, the flow hood is manually held in position over the register, diffuser, or grille while the volume of air flow is measured. The flow hood must then be removed and placed on the floor to allow the technician to climb a ladder to adjust the volume damper. The technician must then climb back down the ladder and reposition the flow hood over the register to measure the air flow a second time. If the air flow is still not correct, this sequence must be repeated over and over in a trial and error fashion until the proper airflow is finally set.

DISCLOSURE OF THE INVENTION

The present invention discloses an adjustable, spring-loaded support mast which is affixed to a standard flow hood in order to maintain the hood in position over ventilation registers, diffusers, and grilles while air flow measurements and adjustments are made. The mast is adjustable in length to accommodate different ceiling heights and is spring loaded to facilitate the positioning and removal of the flow hood over the diffuser as well as to hold it firmly in place. This allows air flow adjustments to be made much more quickly and efficiently, saving time, expense and manpower.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
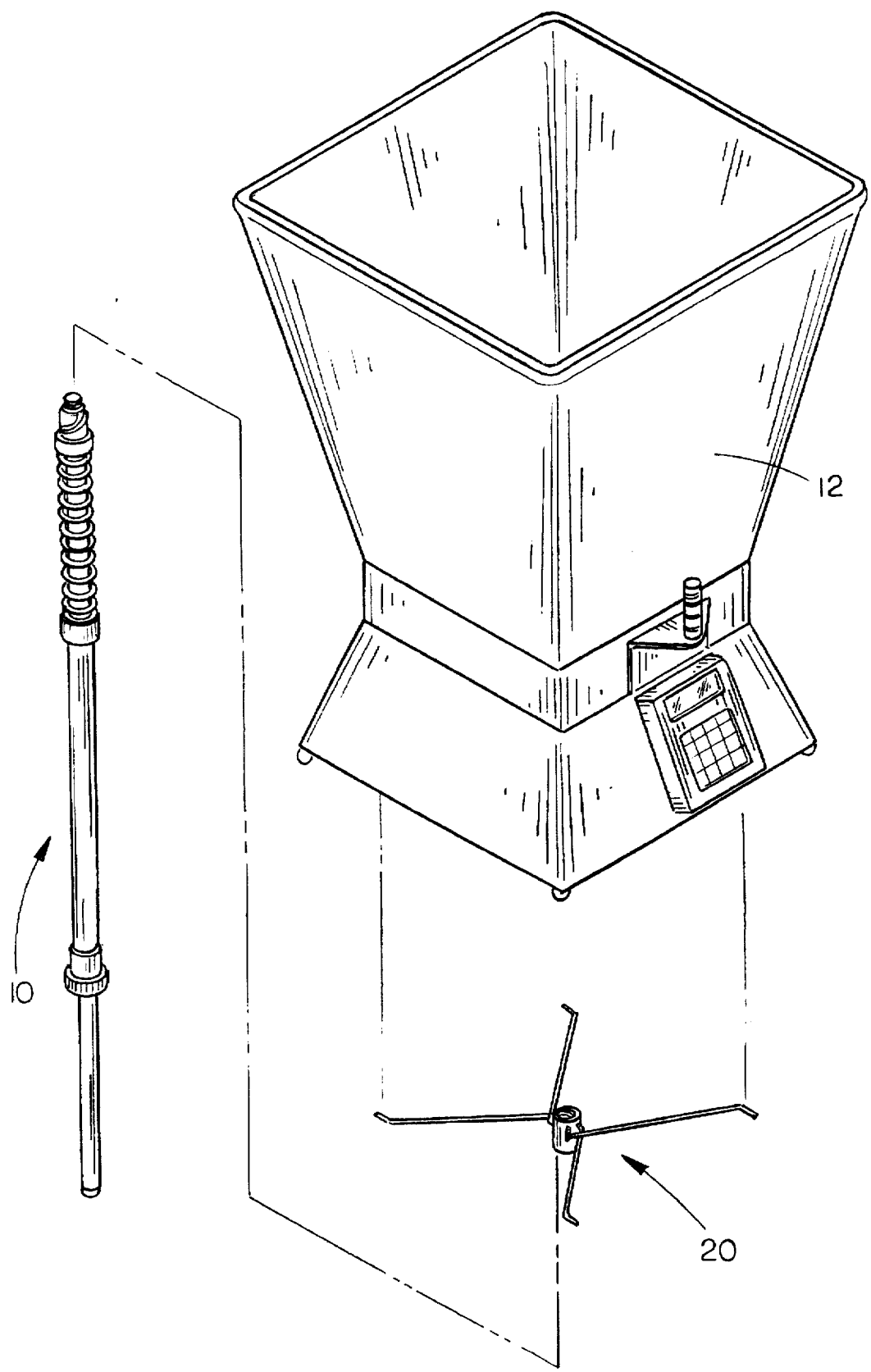
FIG. 1 is a perspective view of the mast and swivel support of the invention and a typical flow hood.

Referring now to the drawings, wherein like reference numerals designate identical or corresponding parts throughout the several views, the mast 10 and the hood attachment unit 20 of the present invention, as well as a standard flow hood 12, are depicted in FIG. 1. The functioning of the invention is clearly seen in FIGS. 2 and 3, where the flow hood 12 is first positioned against a ceiling 14 and over a register, diffuser, or grille 16 (hereinafter referred to as a register), and the mast 10 is then rotated to the vertical position to hold the flow hood 12 in position. As can be seen, the spring 46 is compressed as the mast 10 is pivoted into the vertical position and then extends as the extension leg 52 is placed against the floor 18.

Figure 4:
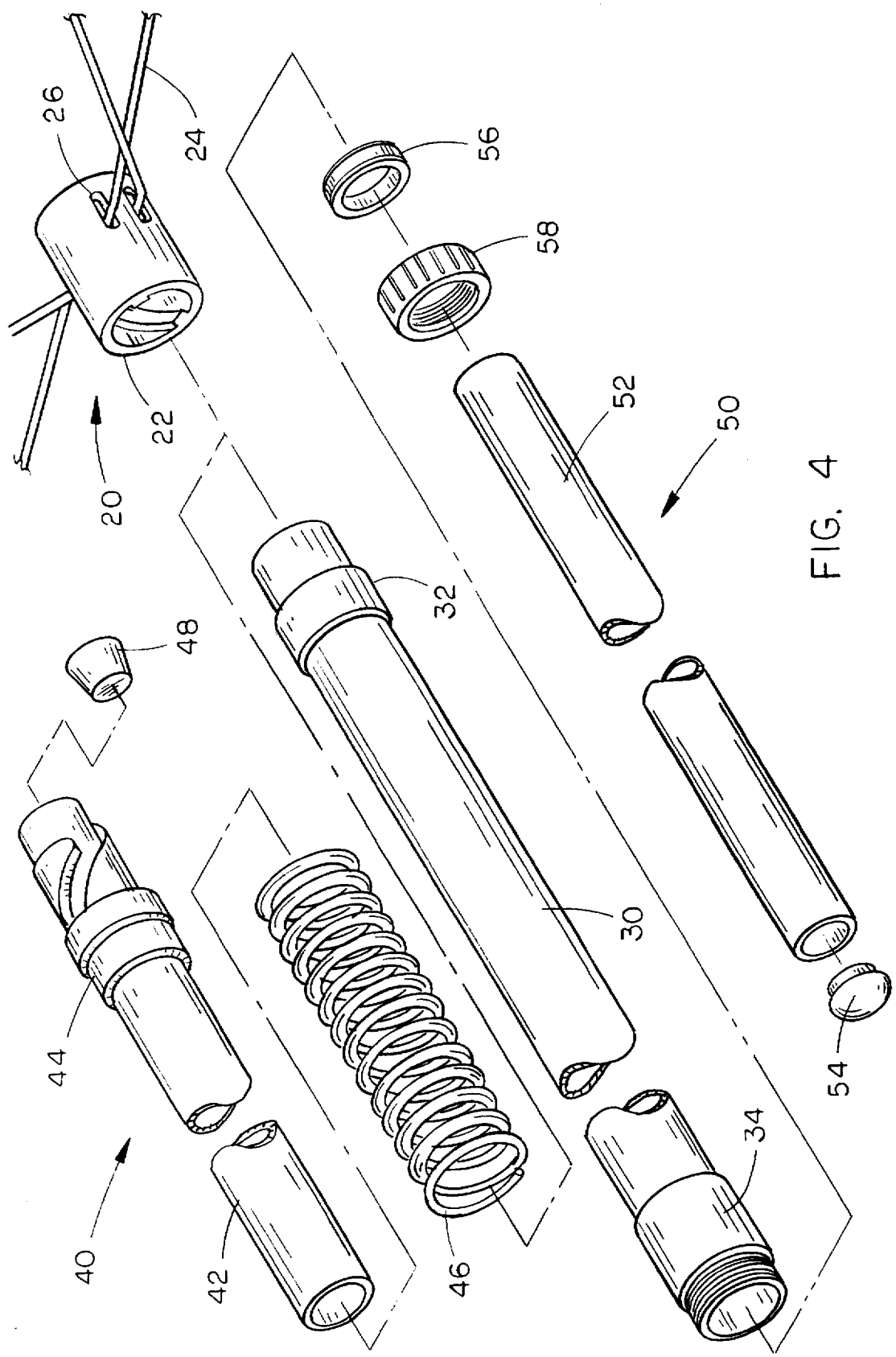
FIG. 4 is an exploded view of the invention.

Referring now to FIG. 4, the invention is shown in an exploded view and comprises four main sections: the hood attachment unit 20 comprising a coupling unit 22 and four support rods 24; the pressure unit 40 comprised of a pressure shaft 42, a shaft collar 44, a spring 46, and an end plug 48; the mast tube 30 having a collar 32 and a threaded end cap 34; and an extension unit 50 comprised of a leg 52 with a foot pad 54, expansion fitting 56 and locking nut 58.

Figures 2, 3:
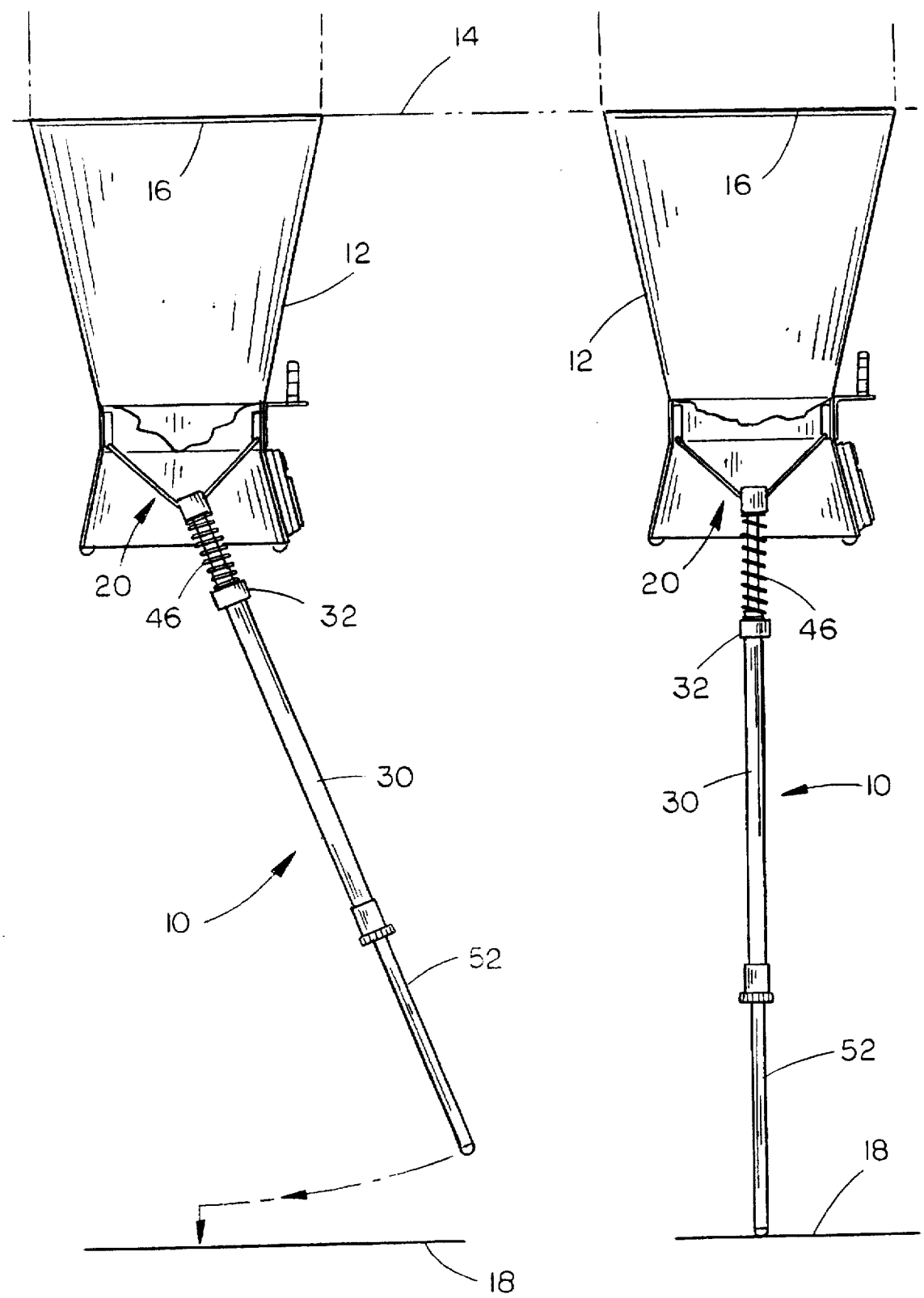
FIG. 2 is a side view, in partial cutaway, of the invention secured to a flow hood in preparation for securing it over a ventilation register.
FIG. 3 is the same view as FIG. 2, with the invention holding the flow hood in position over a ventilation register.
Figure 5:
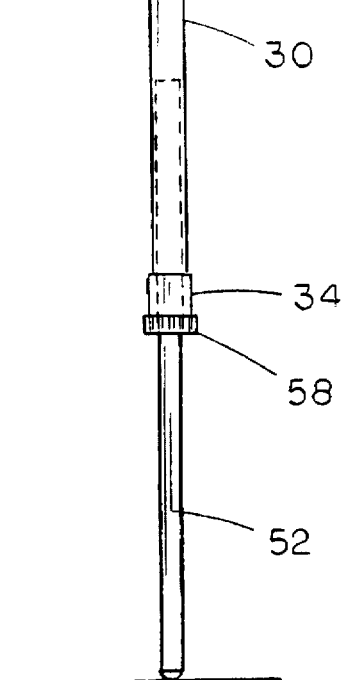
FIG. 5 is a side view of the invention in partial section and depicts the functioning of the adjustable-length leg and the spring-loaded pressure shaft.
Figure 6:
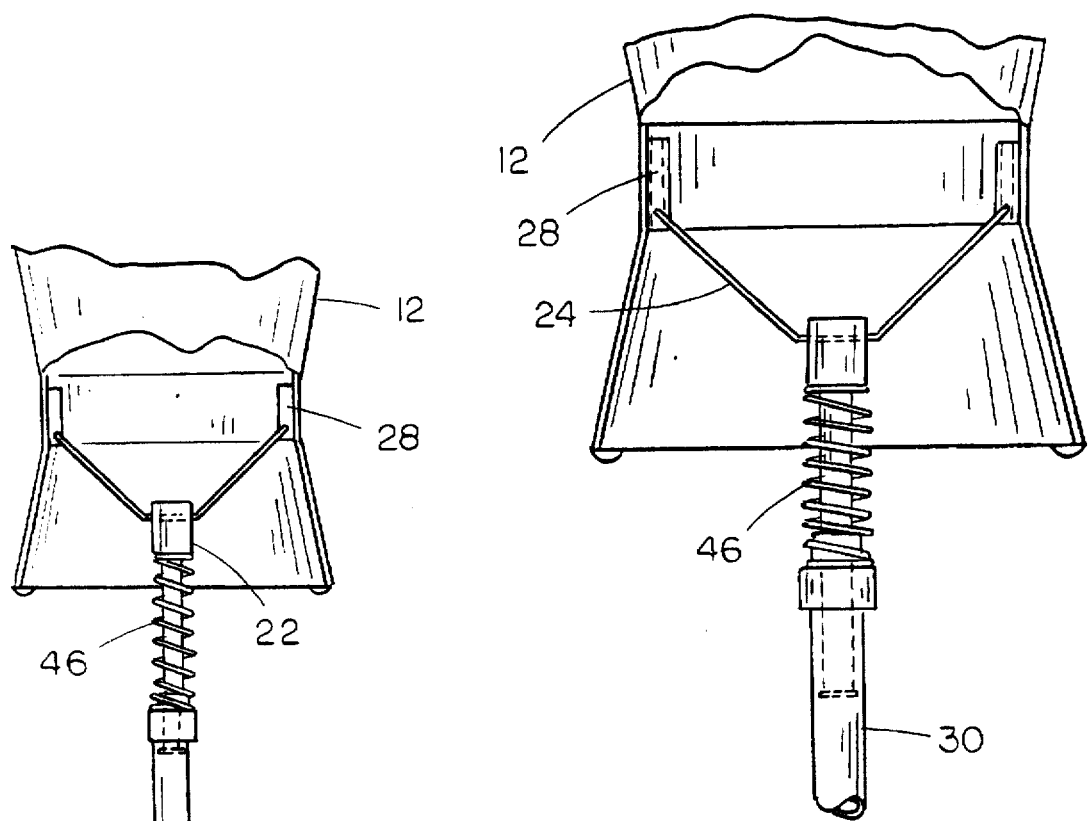
FIG. 6 is a side view, in partial section, of the upper portion of the invention.
Figure 8:
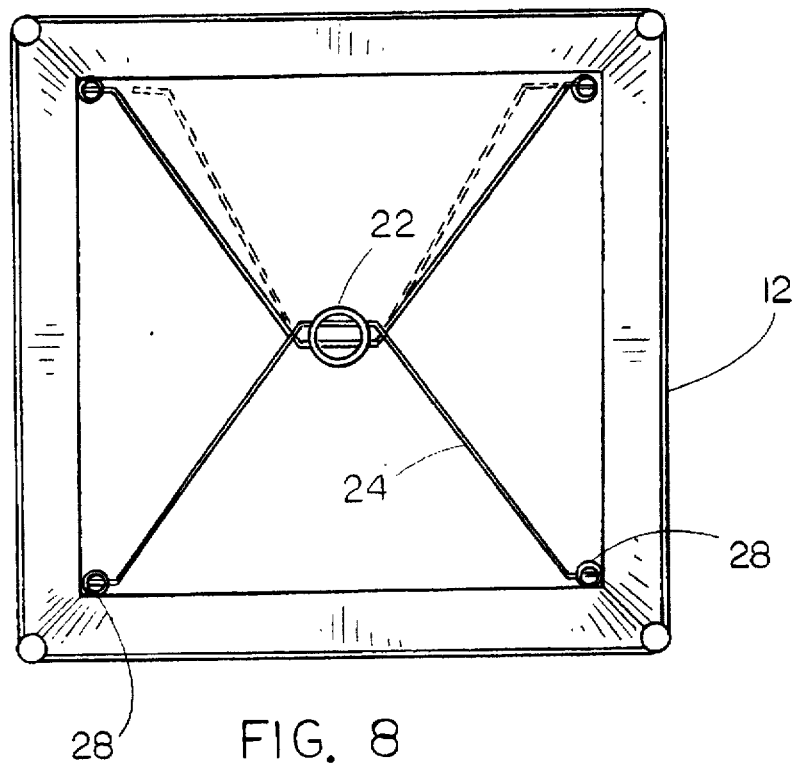
FIG. 8 is a bottom view of a standard flow hood and depicts the placement of the swivel support rods within the flow hood.

In the preferred embodiment, the invention is constructed from polyvinyl chloride (PVC) tubing and fittings, although of course plastic, aluminum and other materials could be substituted. The coupling unit 22 is a short tube of PVC, preferably threaded on the inside, and receives the upper end of the pressure shaft 42, which is also preferably threaded. The four support rods 24 are actually comprised of two steel rods which pass through holes 26 formed through the coupling unit 22 and then extend outward and upward where they are inserted within holes drilled into the flow hood support structure 28 (FIGS. 5, 6 & 8). This construction method allows the coupling unit 22 to pivot or rotate on the support rods 24, as seen in FIGS. 2 & 3. In the preferred usage of the invention, the hood attachment unit 20 will remain attached to the flow hood 12, while the mast 10 is removed from the coupling unit 22 during transportation and storage.

The pressure unit 40 utilizes a section of PVC tubing as a pressure shaft 42 approximately 18 inches long and one inch in diameter which is preferably threaded at the upper end, and has a spring retention collar 44 secured to the shaft 42 adjacent the threads. A spring 46 is placed over the shaft 42 and onto collar 44 and the shaft 42 is then telescoped to within the upper end of the mast tube 30. A rubber end plug 48 may be fitted into the upper end of the pressure shaft 42 to protect any walls the mast 10 may be leaned against.

The mast tube 30 includes an upper spring retention collar 32 secured to the mast tube 30 to support the spring 46 while the pressure shaft 42 is compressed to within the mast tube 30. The lower end of the mast tube 30 is fitted with a threaded end cap 34 for receiving the locking nut 58 of the extension unit 50. The leg 52 of the extension unit telescopes within the lower end of the mast tube 30 and is locked at a particular length, depending on the local ceiling height, by compressing the expansion fitting 56 between the locking nut 58 and the end cap 34, thereby squeezing the leg 52 and preventing its movement. A foot pad 54 protects the floor from damage.

Figure 7:
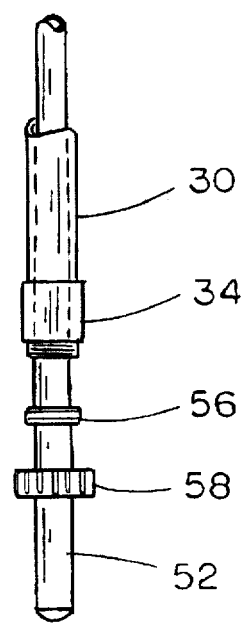
FIG. 7 is a side view, in partial section, of the lower portion of the invention.

FIGS. 5 and 6 clearly show the telescoping action of the pressure shaft 42 to within the upper end of the mast tube 30 during compression of the spring 46 while the flow hood 12 is held in place over a register. FIGS. 5 and 7 depict the telescoping action of the leg 52 within the lower end of the mast tube 30 and the workings of the locking nut 58 and expansion fitting 56.

FIG. 8 is a bottom plan view of the hood support unit 20 being positioned within a flow hood 12. The ends of the support rods 24 are inserted into holes drilled into the flow hood support structure 28.

Figure 9:
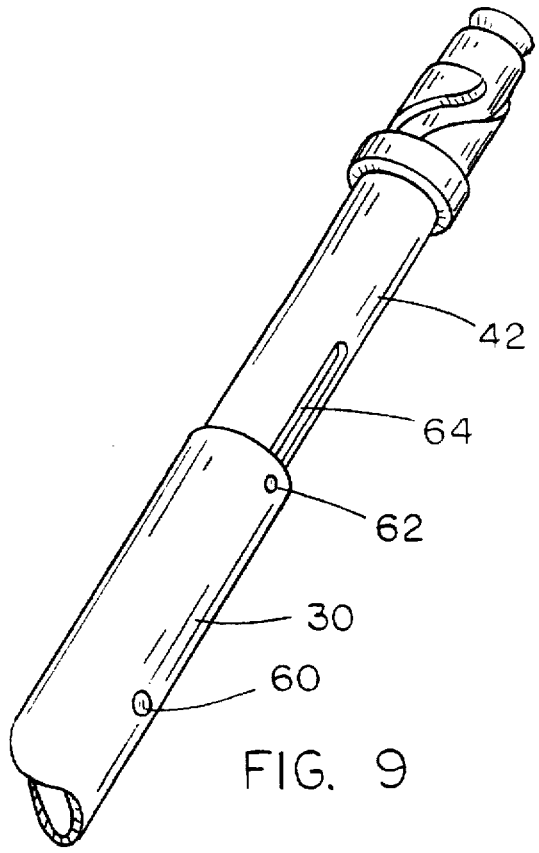
FIG. 9 depicts a second embodiment of the spring-loaded push rod of the invention.
Figure 10:
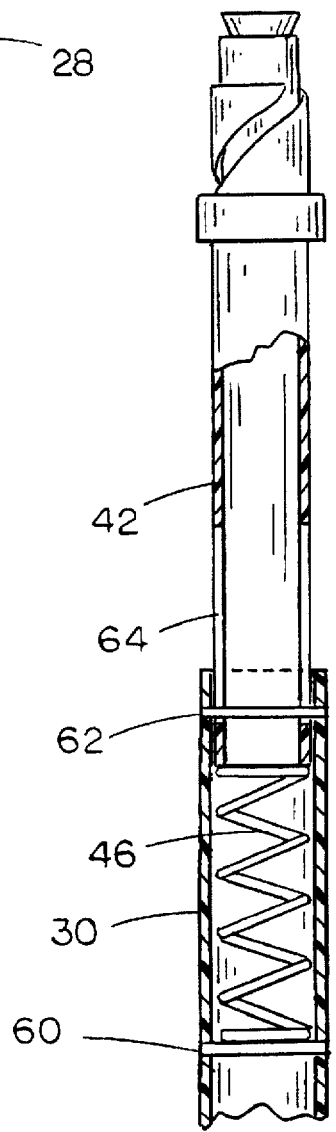
FIG. 10 is a side view in partial section of the second embodiment of FIG. 9.

A second embodiment of the invention is depicted in FIGS. 9 and 10 in which the spring 46 is carried internally within the upper end of the mast tube 30. The lower end of the spring is supported by a spring pin 60, while the pressure shaft 42 is held in its extended position by means of a pin 62 extending through the mast tube and through elongate slots 64 formed in the pressure shaft 42. The lower end of the pressure shaft 42 rests upon the top of the spring 46.

Obviously, many modifications and variations of the present invention are possible in light of the above teachings. It is therefore to be understood that, within the scope of the appended claims, the invention may be practiced otherwise than as specifically described.

What is claimed is:

1. A self-supporting flow hood for measuring air flow through diffusers, registers, and grilles, comprising:

(a) a flow hood having a plurality of apertures formed therein;

(b) a mast tube, having an upper end and a lower end;

(c) a pressure shaft, having an upper end and a lower end, an extended position and a retracted position, said lower end telescopically received within the upper end of said mast tube, and having means for urging said pressure shaft to the extended position; and (d) a coupling unit, affixed to the upper end of said pressure shaft, and having a plurality of hood support rods pivotally extending therefrom wherein the plurality of support rods are dimensioned to be received in said plurality of apertures in said flow hood.

2. The flow hood as recited in claim 1, and further comprising an extension leg having an upper end and a lower end, said upper end telescopically received within the lower end of said mast tube.

3. The flow hood as recited in claim 1 wherein said coupling unit is removably affixed to the upper end of said pressure shaft.

4. The flow hood as recited in claim 1 wherein said means for urging said pressure shaft to the extended position comprises a first collar secured to said pressure shaft, a second collar secured to said mast tube, and a spring carried therebetween.

5. The flow hood as recited in claim 1 wherein said means for urging said pressure shaft to the extended position comprises a spring carried within said mast tube.

* * * * *